United States Patent
Gandhi

(10) Patent No.: US 10,200,963 B2
(45) Date of Patent: Feb. 5, 2019

(54) REDUCING POWER CONSUMPTION AND NETWORK USAGE WHEN LOCATING A USER DEVICE

(71) Applicant: Verizon Patent and Licensing Inc., Arlington, VA (US)

(72) Inventor: Ashish R. Gandhi, Brentwood, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 935 days.

(21) Appl. No.: 14/341,357

(22) Filed: Jul. 25, 2014

(65) Prior Publication Data
US 2016/0029338 A1    Jan. 28, 2016

(51) Int. Cl.
*H04W 64/00*     (2009.01)
*H04M 3/22*      (2006.01)
*G01S 5/00*      (2006.01)
*G01S 5/02*      (2010.01)

(52) U.S. Cl.
CPC ............ *H04W 64/00* (2013.01); *G01S 5/00* (2013.01); *G01S 5/0236* (2013.01); *G01S 5/0252* (2013.01); *H04M 3/2218* (2013.01); *Y02B 60/50* (2013.01); *Y02D 70/00* (2018.01)

(58) Field of Classification Search
USPC ......................................... 715/736, 772, 863
See application file for complete search history.

(56) References Cited

U.S. PATENT DOCUMENTS

| | | | | |
|---|---|---|---|---|
| 7,466,986 | B2 * | 12/2008 | Halcrow | H04W 48/16 455/456.1 |
| 8,150,367 | B1 * | 4/2012 | Malladi | G01S 5/02 455/404.2 |
| 8,700,060 | B2 * | 4/2014 | Huang | G06F 17/3087 455/456.1 |
| 2006/0240840 | A1 * | 10/2006 | Morgan | G01S 5/02 455/456.1 |
| 2007/0202888 | A1 * | 8/2007 | Brachet | G01S 5/02 455/456.1 |
| 2007/0213101 | A1 * | 9/2007 | Oh | H04W 28/14 455/572 |
| 2011/0051665 | A1 * | 3/2011 | Huang | G01S 5/0027 370/328 |

* cited by examiner

*Primary Examiner* — Christopher J Fibbi

(57) ABSTRACT

A user device may determine an access point within communication range of the user device; determine whether location information, associated with the access point, is stored by the user device in the data structure; and obtain, based on the determination that the location information is not stored by the user device, a location of the user device. When obtaining the location information of the user device, the user device may invoke location identification hardware. The user device may store the obtained location information of the user device, in the data structure, as location information corresponding to the access point; obtain, based on the determination that the location information is stored in the data structure, the location information of the user device from the data structure; generate a location record identifying the location of the user device; and store or output the location record.

20 Claims, 8 Drawing Sheets

| Beacon Frame Information | | Location |
|---|---|---|
| SSID | MAC Address | |
| SSID 123 | 00:00:00:00:00:00 | 37.773812,-122.503709 |
| SSID 234 | 00:00:00:00:00:01 | 37.7173823,-122.416606 |
| SSID 342 | 00:00:00:00:00:02 | 37.8178714,-122.4793005 |
| ... | | |

REDUCING POWER CONSUMPTION AND NETWORK USAGE WHEN LOCATING A USER DEVICE

BACKGROUND

Location of a user device, associated with a cellular network, may be determined when the user device is used to place and/or receive a telephone call and/or a text message (e.g., a short message service (SMS) message). For example, a call details record (CDR) may be generated each time the user device is used to place or receive a telephone call and/or a text message. The CDR may identify a base station with which the user device communicates. An approximate location of the user device (e.g., within approximately 500 meters) may be determined based on the location of the base station and/or based on the location of other nearby base stations, such as using trilateration and/or triangulation techniques. This approximate location may be determined when a CDR is recorded.

BRIEF DESCRIPTION OF THE DRAWINGS

FIG. 4 illustrates an example data structure that may store location information for access points;

DETAILED DESCRIPTION OF THE PREFERRED EMBODIMENTS

The following detailed description refers to the accompanying drawings. The same reference numbers in different drawings may identify the same or similar elements.

Systems and/or methods, as described herein, may identify the location of a user device based on identification of a wireless network within a communications range of the user device. As such, the location of the user device may be determined without the need to invoke location identification hardware (e.g., global positioning system (GPS) hardware), thereby conserving battery power on the user device and reducing metered network data usage. Also, a more accurate location may be determined in relation to when location is determined based on the location of a base station via which the user device was used to make and/or receive telephone calls and/or text messages. In some implementations, location records, identifying the location of the user device at different points in time, may be generated and stored for later retrieval (e.g., to provide the user device with targeted content based on location history of the user device).

Figure 1:
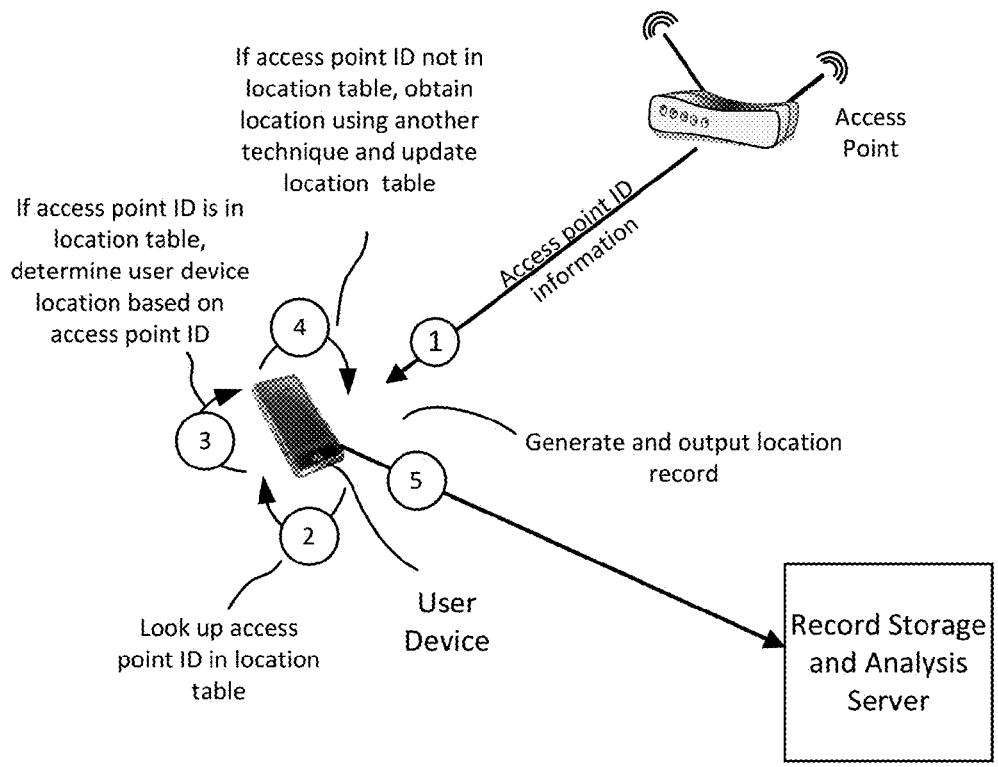
FIG. 1 illustrates an example overview of an implementation described herein.

FIG. 1 illustrates an example overview of an implementation described herein. In FIG. 1, assume that a user device is within a communications range of an access point associated with a wireless network (e.g., a relatively short range Wi-Fi network). Given these assumptions, the user device may receive access point identification (ID) information from the access point (arrow 1). For example, the user device may receive a service set identifier (SSID) associated with the wireless network, a media access control (MAC) address of the access point, and/or some other information regarding the wireless network and/or the access point associated with the wireless network. In some implementations, the user device may receive the access point ID information from beacon frames outputted by the access point.

As further shown in FIG. 1, the user device may look up the access point ID in a location table maintained by the user device (arrow 2). For example, the user device may store a table that identifies a geographic location of access points (e.g., longitude/latitude coordinates, an address, etc.) based on the access point ID of the access points. If the access point ID is in the location table, the user device may determine its geographic location based on the received access point ID (arrow 3). If, on the other hand, the access point ID is not in the location table, the user device may obtain its location using another technique (arrow 4.). For example, the user device may obtain its location by invoking location identification hardware and/or software processes (e.g., global positioning system (GPS) radio, a cellular radio for triangulation techniques, etc.). Once the user device has determined its location, the user device may generate a location record, and output the location record to a record storage and analysis server (arrow 5).

At a later time, when the user device enters a communications range of the access point, the user device may determine its location based on the access point ID information of the access point without having to invoke the location determination hardware (e.g., GPS) and/or location determination processes on the user device. GPS queries can, for example, require network calls and/or other processes that can drain the battery of the user device. By avoiding GPS queries, the user device can reduce power consumption and metered network data usage. As the user device discovers additional wireless networks associated with additional access points, the user device may store the locations of the newly discovered wireless networks.

The information, stored and/or obtained by the user device and/or other devices, may be stored and/or collected on an "opt-in" basis. For example, the user device may only obtain location information after express permission is given by the user of the user device. In some implementations, the user may be given the opportunity to review information (such as location information, etc.) that has been collected, regarding or on behalf of the user, and to delete the information and/or make the information unavailable for use. In some implementations, the user may have the opportunity to "opt out," in which case the user device may cease receiving and/or storing information regarding the user, and may delete any existing information regarding the user. Further, the user may have the option to share the information with individual third parties (such as payment processors, advertisers, etc.), or to refrain from sharing the information with any or all parties.

Figure 2:
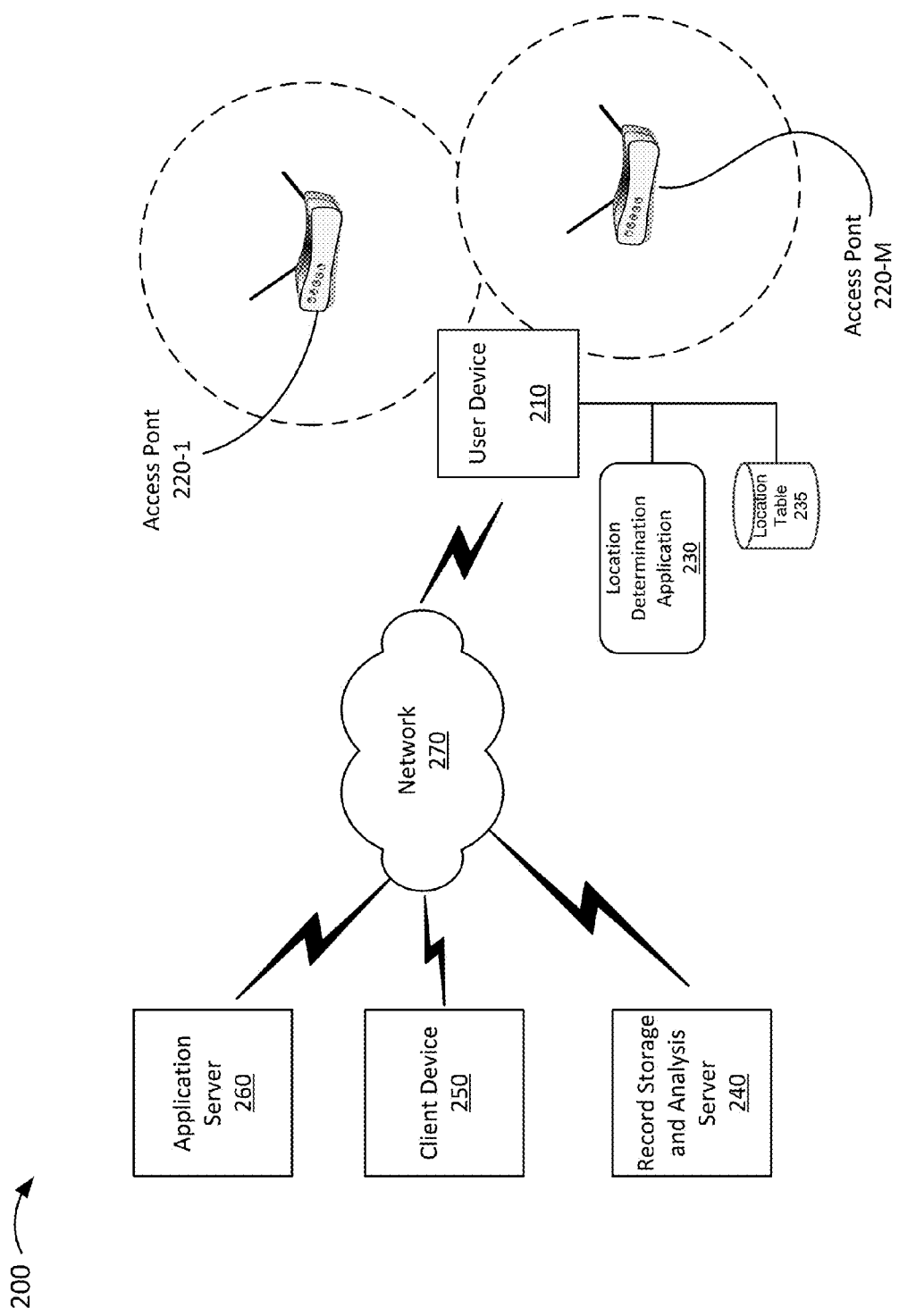
FIG. 2 illustrates an example environment in which systems and/or methods, described herein, may be implemented.

FIG. 2 is a diagram of an example environment 200 in which systems and/or methods described herein may be implemented. As shown in FIG. 2, environment 200 may include user device 210, access points 220-1 through 220-M (where M is greater than or equal to 1), record storage and analysis server 240, client device 250, application server 260, and network 270. User device 210 may include an application, labeled as location determination application 230, and user device 210 may maintain a table, labeled as location table 235, correlating access points/wireless networks to geographic locations.

User device 210 may include any device capable of communicating via a network, such as network 270. For example, user device 210 may correspond to a mobile communication device (e.g., a smart phone or a personal digital assistant (PDA)), a portable computer device (e.g., a laptop or a tablet computer), a gaming device, or another type of computing device. When user device 210 is within a communications range of access point 220, user device 210 may receive access point ID information outputted by access point 220 (e.g., via beacon frames outputted by access point 220).

As mentioned, user device 210 may include location determination application 230 and location table 235. Location determination application 230 may be an application installed by a user or an application installed during manufacture or provisioning of user device 210. Location determination application 230 may run as a background application that periodically or intermittently obtains the location of user device 210. Alternatively, location determination application 230 may be an application that, at certain times, is executed by another process associated with user device 210. In this case, location determination application 230, when executed, may obtain the location of user device 210 and may then terminate execution.

Location table 235 may include a table, cache, database, or other data structure that is used, by location determination application 230, to store information identifying the locations (e.g., as latitude and longitude pairs) of access points 220 that are discovered by user device 210. Because access points 220 may implement wireless networks having relatively short communications ranges, the location of user device 210, when within communications range of an access point 220, may be stored, in location table 235 as an estimate of the location of access point 220.

Access point 220 may include an access point, wireless router, and/or some other type of device that may implement a wireless network or wireless network access point. The wireless network may include short range wireless networks such as a Wi-Fi based network. In some implementations, access point 220 may output wireless signals including a beacon frame. The beacon frame may announce the presence of a wireless network implemented by access point 220. The beacon frame may include information identifying the wireless network or access point, such as SSID of the wireless network, a MAC address of access point 220, a hardware identifier of access point 220, and/or some other information regarding the wireless network and/or access point 220 associated with the wireless network. In some implementations, the beacon frame may identify a type of wireless network and/or a type of access point 220 (e.g., a fixed access point 220 associated with a fixed location, or a mobile access point 220).

Record storage and analysis server 240 may include one or more computing devices, such as a server device or a collection of server devices. Record storage and analysis server 240 may receive, from user device 210, information identifying the location of user device 210. The location information of user device 210 may be received each time location determination application 230 determines the location information of user device 210 or may be received as an aggregated data structure of the recorded locations of user device over a particular time period (e.g., a day). Record storage and analysis server 240 may receive a request for a report (e.g., from client device 250 via application server 260) that identifies location records (where each location record corresponds to one or more locations of user device 210) meeting particular criteria. For example, record storage and analysis server 240 may receive a request for a report for location records identifying the location history of user devices 210 (e.g., a report identifying particular user devices 210 that were located within a particular proximity during particular times). Additionally, or alternatively, record storage and analysis server 240 may receive a request for a report that identifies location records meeting other criteria.

Client device 250 may include one or more computing devices, such as a server device, a desktop computing device, a portable computing device, or the like. Client device 250 may request, via application server 260 and from record storage and analysis server 240, a report identifying location records meeting particular criteria. The request may include an identifier of a requesting party, authentication information, and/or other information. In some implementations, client device 250 may receive the report to identify the location history of user device 210. For example, client device 250 may be associated with an advertiser or other party that may request the report to provide targeted content to user device 210 based on the location history of user device 210.

Application server 260 may include one or more computing devices, such as a server device or a collection of server devices. In some implementations, application server 260 may store privacy preferences for user device 210, such as preferences identifying particular parties that may receive location records. In some implementations, the privacy preferences may indicate that location records indicating the location of user device 210 at particular times of day may be provided, while location records indicating the location of user device 210 at other times of day may not be provided. Application server 260 may receive a request for a report from client device 250, authenticate client device 250 based on authentication information included in the request, output the request to record storage and analysis server 240, and receive the report from record storage and analysis server 240. Application server 260 may apply privacy filters to the report to remove location records associated with user devices 210 whose users have not permitted client device 250 to receive location records. Application server 260 may output the filtered report to client device 250.

Network 270 may include one or more wired and/or wireless networks. For example, network 270 may include a cellular network (e.g., a second generation (2G) network, a third generation (3G) network, a fourth generation (4G) network, a fifth generation (5G) network, a long-term evolution (LTE) network, a global system for mobile (GSM) network, a code division multiple access (CDMA) network, an evolution-data optimized (EVDO) network, or the like), a public land mobile network (PLMN), and/or another network. Additionally, or alternatively, network 270 may include a local area network (LAN), a wide area network (WAN), a metropolitan network (MAN), the Public Switched Telephone Network (PSTN), an ad hoc network, a managed Internet Protocol (IP) network, a virtual private network (VPN), an intranet, the Internet, a fiber optic-based network, and/or a combination of these or other types of networks.

The quantity of devices and/or networks in environment 200 is not limited to what is shown in FIG. 2. In practice, environment 200 may include additional devices and/or networks; fewer devices and/or networks; different devices and/or networks; or differently arranged devices and/or networks than illustrated in FIG. 2. Also, in some implementations, one or more of the devices of environment 200 may perform one or more functions described as being performed by another one or more of the devices of environment 200. Devices of environment 200 may interconnect via wired connections, wireless connections, or a combination of wired and wireless connections.

Figure 3:
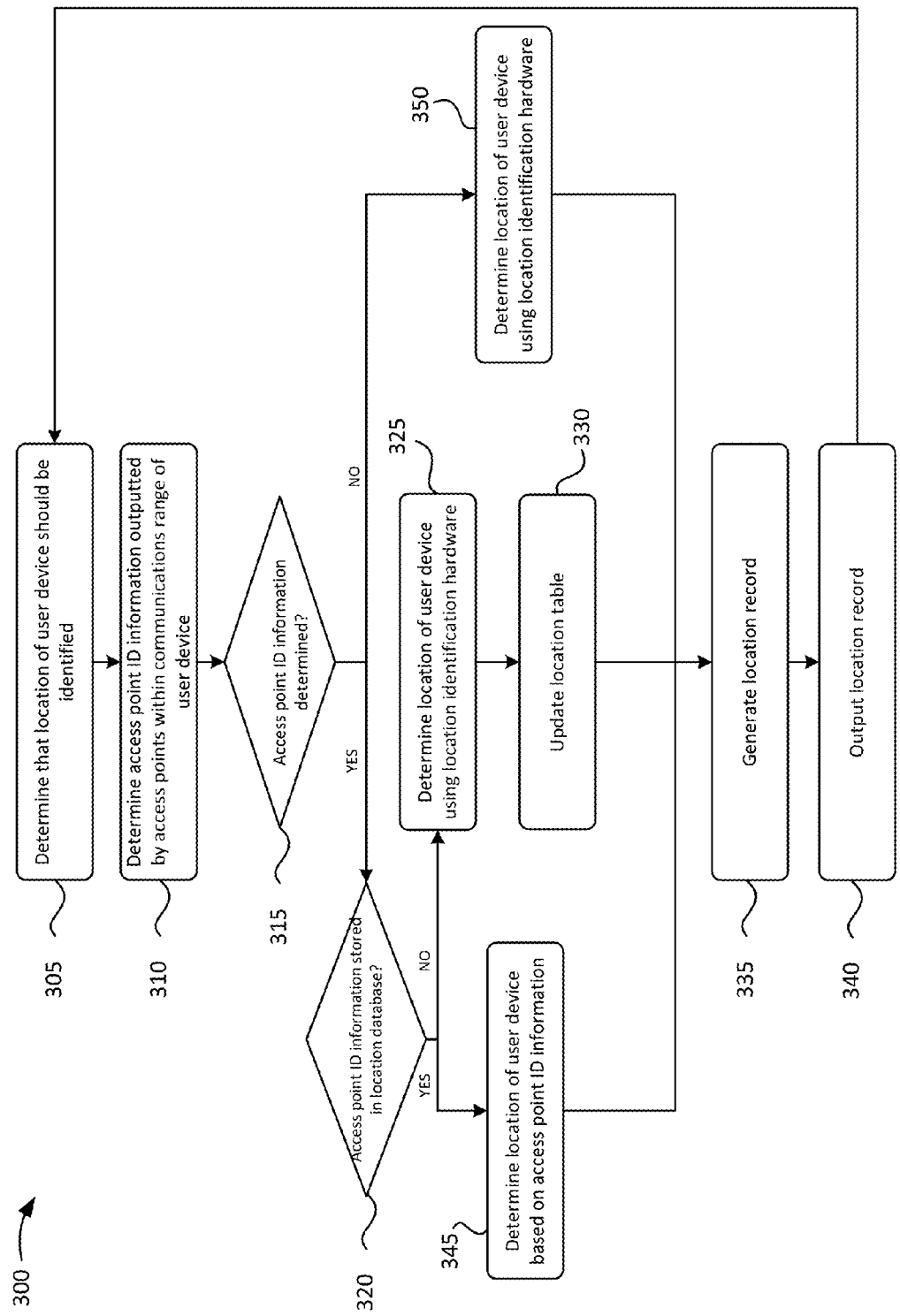
FIG. 3 illustrates a flowchart of an example process for updating a location table, and generating a location record based on access point ID information.

FIG. 3 illustrates a flowchart of an example process 300 for updating a location table, and generating a location record based on access point ID information. In some implementations, process 300 may be performed by user device 210 (e.g., by location determination application 230 running within user device 210).

As shown in FIG. 3, process 300 may include determining that the location of a user device should be identified (block 305). For example, location determination application 230 may determine that the location of user device 210 should be identified after a particular period of time from which the location of user device 210 was previously identified (e.g., a period of time from which a location record identifying the location of user device 210 was previously generated). As an example, location determination application 230 may determine that the location of user device 210 should be identified at periodical intervals (e.g., every hour, every 2 hours, or some other interval). Additionally, or alternatively, a time interval between determining the location of user device 210 may be determined based on the mobility of user device 210. For example, if user device 210 previously determined that user device 210 was located outdoors, on a roadway, or is moving, use device 210 may determine that a user of user device 210 is traveling, and that the location of user device 210 should be determined relatively sooner than if location determination application 230 previously determined that user device 210 was stationary (e.g., when user device 210 was located indoors). For example, it may be desirable to determine the location of user device 210 relatively sooner when user device 210 is traveling since the location of user device 210 may be substantially different over a relatively shorter period of time. Conversely, the time interval for determining the location of user device 210 may be relatively longer when user device 210 is stationary, since the likelihood that user device 210 has substantially relocated is lower when user device 210 is stationary versus when user device 210 is traveling.

Process 300 may also include determining access point ID information outputted by access points within communications range of the user device (block 310). In some implementations, location determination application 230 may extract the access point ID identification information from beacon frames transmitted by Wi-Fi access points 220 that are within communication range of user device 210. In some implementations, location determination application 230 may obtain the access point ID information for access points 220 associated with a fixed location, as opposed to obtaining access point ID information for mobile access points 220. Process 300 may also include determining whether access point ID information has been determined (block 315). For example, location determination application 230 may determine that access point ID information has been determined when user device 210 is within communications range of access point 220, and when user device 210 receives access point ID information from access point 220 (e.g., via beacon frames transmitted by access point 220). Location determination application 230 may determine that access point ID information has not been determined when user device 210 is not within communications range of access point 220, and/or when wireless networking hardware and/or wireless networking software processes on user device 210 are disabled.

If, for example, access point ID information has been determined (block 315-YES), process 300 may further include determining whether the access point ID information is stored in the location table (block 320). For example, location determination application 230 may look up the access point ID information in location table 235 (e.g., a MAC address of access point 220, an SSID of a wireless network associated with access point 220, a hardware identifier of access point 220, and/or other information associated with access point 220 and/or the wireless network associated with access point 220). In some implementations, location determination application 230 may look up only particular access point ID information in location table 235, such as a MAC address and/or a hardware identifier (e.g., since an SSID may be changed).

If the access point ID information is not stored in the location table (block 320-NO), process 300 may further include determining a location of the user device using location identification hardware (block 325). For example, location determination application 230 may invoke location identification hardware (e.g., GPS hardware) and/or location identification software processes on user device 210 in order to determine location information of user device 210. User device 210 may determine the location information in the form of longitude/latitude coordinates, information identifying a street address, and/or in another form.

Process 300 may also include updating the location table (block 330). For example, location determination application 230 may update the location table by storing an association between the access point ID information and the determined location of user device 210. As a result, location determination application 230 may identify the location of user device 210 based solely on the access point ID information when user device 210 subsequently moves to within range of access point 220. That is, location determination application 230 may identify the location of user device 210 (e.g., when user device 210 subsequently moves to within range of access point 220) without the need to invoke location identification hardware on user device 210.

In some implementations, location determination application 230 may modify the determined location, that is stored in location table 235, to attempt to more accurately represent the location of access point 220 than using the location information of user device 210 to represent the location of access point 220. For example, based on a signal strength of the beacon signal output by access point 220 and received by user device 210, location determination application 230 may determine that access point 220 is located at least a certain distance, and in a certain direction, from the current location of user device 210. The location information may thus be adjusted based on the certain distance. As another example, multiple GPS-based locations, associated with a particular access point, may be obtained over time. Clustering, averaging, or triangulation techniques may be used to obtain a more accurate indication of the location of the corresponding access point 220.

Process 300 may further include generating a location record (block 335). For example, location determination application 230 may generate a location record that identifies the location of user device 210, a timestamp indicating when user device 210 was at the location (e.g., a timestamp corresponding to when the location of user device 210 was determined), an ID of user device 210, and/or other information regarding user device 210.

In some implementations, location determination application 230 may generate the location record even if location information has not been determined by the location identification hardware and/or location identification software processes of user device 210. For example, location determination application 230 may generate a location record that identifies a "coarse" location (e.g., an approximate location) based on cellular triangulation techniques and/or other techniques.

Process 300 may also include outputting the location record (block 340). For example, location determination application 230 may output the location record to record storage and analysis server 240. To decrease network usage and/or conserve power, location determination application 230 may aggregate a group of location records and transmit the group, to record storage and analysis server 240, as a single batch process. In this case, location determination application 230 may output the group after a threshold quantity of location records have been generated and stored, at certain time intervals (e.g., once a day), or at other intervals. In some implementations, user device 210 may output location records when user device 210 is connected to an external power source and/or when user device 210 is connected to a wireless LAN (e.g., to prevent battery drainage on user device 210 and/or to prevent the consumption of metered data usage when user device 210 is not connected to a wireless LAN).

If the access point ID information is stored in the location table (block 320-YES), process 300 may include determining the location of the user device based on the access point ID information (block 345). For example, location determination application 230 may determine the location of user device 210 by using the access point ID information to look up the estimated location of access point 220 in location table 235. That is, location determination application 230 may determine the location of user device 210 without the need to invoke location identification hardware on user device 210, thereby conserving battery power on user device 210 and reducing data network usage.

In some implementations, user device 210 may receive multiple sets of access point IDs from multiple access points 220 within a communications range of user device 210. In this situation, location determination application 230 may determine a particular access point 220 having the strongest signal strength, and may determine the location of user device 210 based on the access point ID of the particular access point 220. Process 300 may further include generating a location record (block 335) and outputting the location record (block 340), as described above.

If, on the other hand, access point ID information has not been determine (block 315-NO), process 300 may include determining a location of the user device using location identification hardware (block 350). For example, location determination application 230 may invoke location identification hardware (e.g., GPS hardware) on user device 210 in order to determine location information of user device 210. User device 210 may then provide the location information to location determination application 230. As a result, location information may still be determined if user device 210 is not in range of an access point. Process 300 may further include generating a location record (block 335), and outputting the location record (block 340) as described above.

Process 300 may be periodically or intermittently repeated each time a location record should be formed. For example, location determination application 230 may determine a time period between which the location of user device 210 should be subsequently determined based on information identifying whether user device 210 was indoors (e.g., stationary) or outdoors (e.g., traveling). Additionally, or alternatively, location determination application 230 may determine the time period based on a traveling speed of user device 210 at the time that the location of user device 210 was determined (e.g., based on GPS location information identifying a traveling speed). Thus, the mobility of user device 210 may be used as a factor to estimate the frequency of the location determination process, in which the frequency of the location determination process when user device is moving (e.g., has a relatively high mobility).

As a result of repeating process 300, location table 235 may store location information associated with newly discovered access points 220. The more location information for access points 220 that is stored in location table 235, the less likely it becomes that location determination application 230 may need to invoke location identification hardware to determine the location of user device 210. In some implementations (e.g., when the location of user device 210 should be determined), user device 210 may activate wireless networking hardware and/or wireless networking software processes, scan for wireless networks (e.g., if wireless networking hardware and/or wireless networking software processes are inactive).

FIG. 4 illustrates an example data structure 400 that may implement location table 235. In some implementations, data structure 400 may be stored in a memory of user device 210. In some implementations, data structure 400 may be stored in a memory separate from, but accessible by, user device 210 (e.g., a "cloud" storage device). In some implementations, data structure 400 may be stored by some other device in environment 200, such as access point 220, and/or record storage and analysis server 240. A particular instance of data structure 400 may contain different information and/or fields than another instance of data structure 400.

Each entry in data structure 400 may identify access point ID information, associated with a particular access point 220, and location information associated with the particular access point 220. As an example, data structure 400 may store access point ID information, associated with a particular access point 220, such as the SSID "SSID 1234" and the MAC address of the particular access point 220, such the MAC address "00:00:00:00:00." Data structure 400 may store location information associated with the particular access point 220, such as longitude and latitude coordinates (e.g., the coordinates "37.7645534,−122.4354113").

While particular fields are shown in a particular format in data structure 400, in practice, data structure 400 may include additional fields, fewer fields, different fields, or differently arranged fields than are shown in FIG. 4. Also, FIG. 4 illustrates examples of information stored by data structure 400. In practice, other examples of information stored by data structure 400 are possible.

Figure 5:
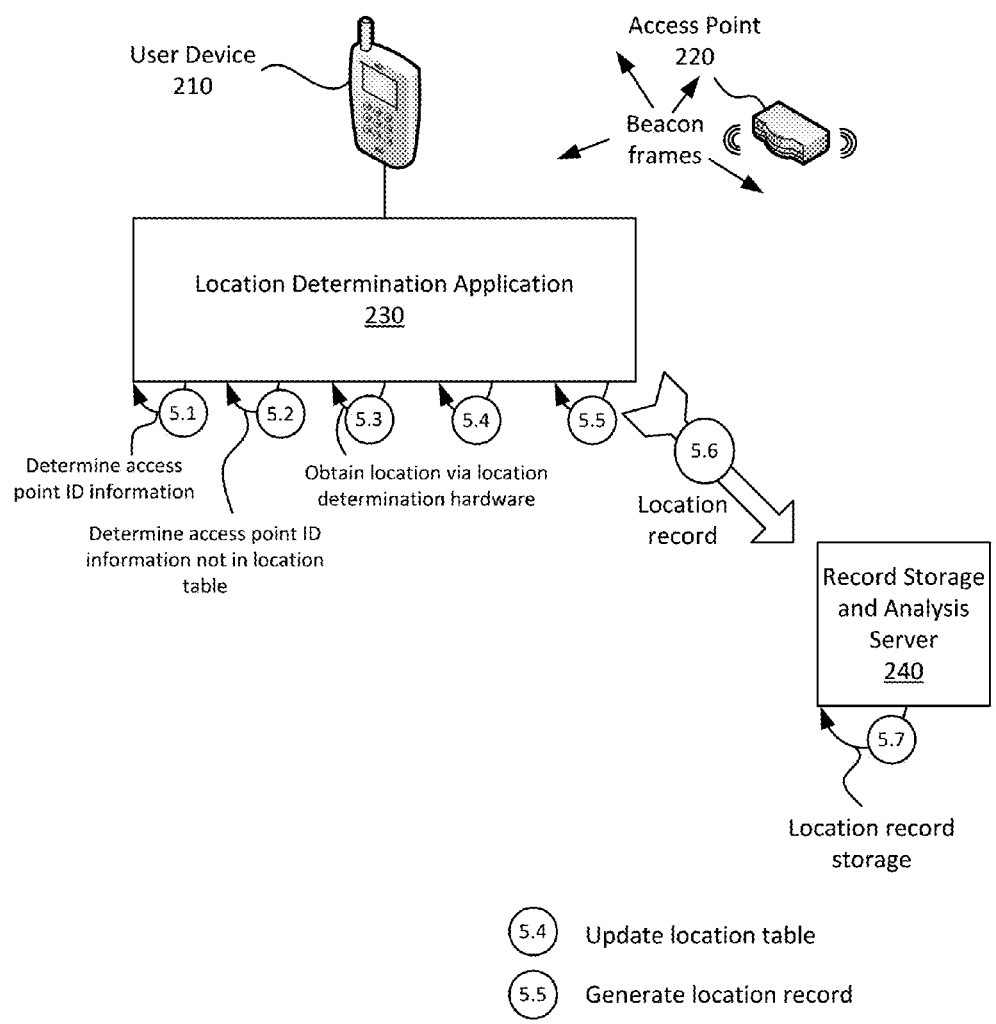
FIGS. 5 and 6 illustrate an example implementation for updating a location table and generating a location record.
Figure 6:
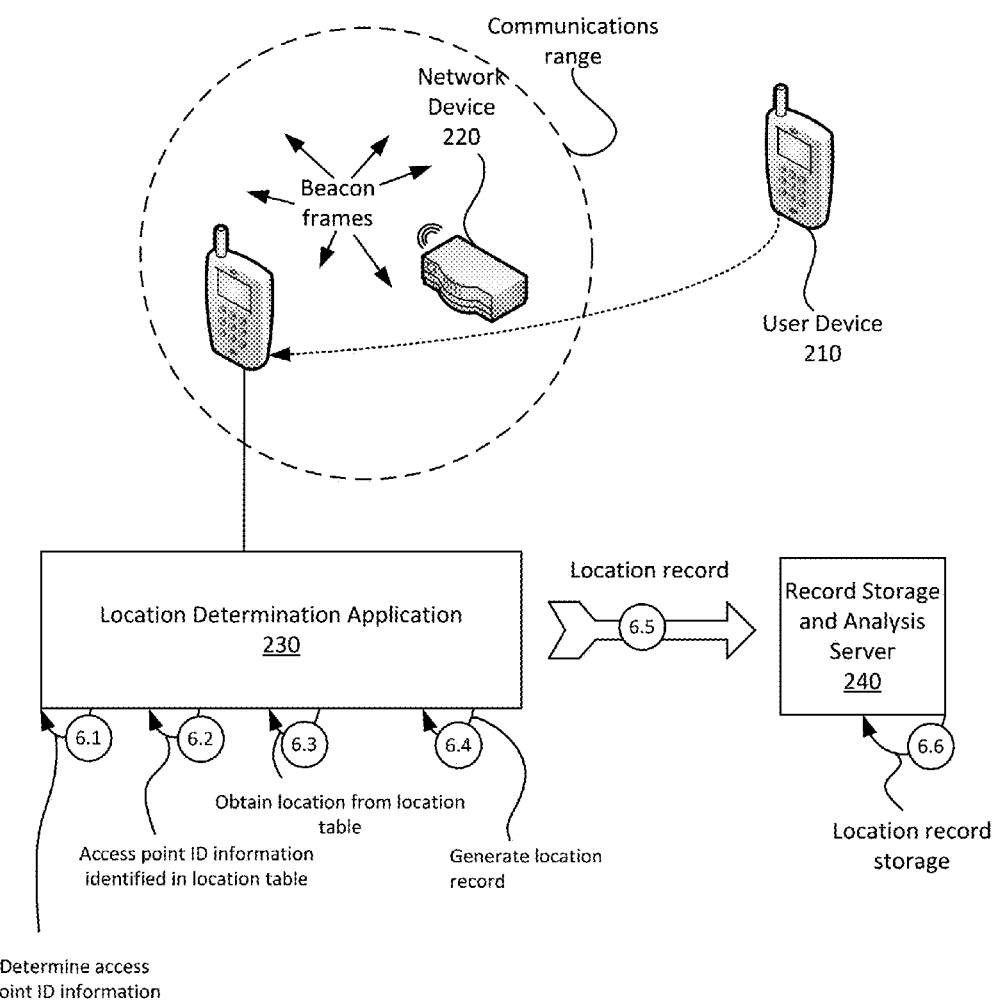

FIGS. 5 and 6 illustrate an example implementation for updating a location table and generating a location record. In FIG. 5, assume that user device 210 is within a communications range of access point 220. As shown in FIG. 5, access point 220 may output beacon frames over a wireless signal to announce the presence of a wireless network implemented by access point 220 (e.g., a Wi-Fi network). User device 210 may receive the beacon frames when user device 210 is within a communications range of access point 220. As shown in FIG. 5, location determination application 230 may determine access point ID information (arrow 5.1). For example, location determination application 230 may extract the access point ID information from the beacon frames received by user device 210.

Based on determining the access point ID information, location determination application 230 may look up the access point ID information in a location table, and may determine that the access point ID information is not in the location table (arrow 5.2). Location determination application 230 may then invoke location identification hardware and/or location identification software processes on user device 210 to obtain location information of user device 210 (arrow 5.3). Location determination application 230 may then update the location table (arrow 5.4) to identify that the access point 220 associated with the access point ID information is located at the location identified by user device 210. Location determination application 230 may then generate a location record (arrow 5.5), and output the location record to record storage and analysis server 240 (arrow 5.6). Record storage and analysis server 240 may store the location record (arrow 5.7) for later retrieval.

Since the location of access point 220 has been stored in the location table (e.g., based on the access point ID of access point 220), location determination application 230 may determine the location of user device 210 based on the access point ID information of access point 220 when user device 210 later returns to within communications range of access point 220. For example, location determination application 230 may determine the location of user device 210 based on the access point ID information of access point 220 without invoking location identification hardware and/or location identification software processes on user device 210, thereby reducing power consumption on user device 210 and reducing metered network data usage.

Referring to FIG. 6, assume that after location determination application 230 updates the location table to identify the location of access point 220 and after user device 210 leaves the communications range of access point 220, user device 210 subsequently travels to within a communications range of access point 220. As shown in FIG. 6, user device 210 may receive beacon frames via wireless signals outputted by access point 220. Location determination application 230 may determine access point ID information of access point 220 by extracting this information from the beacon frames (arrow 6.1).

Based determining the access point ID of access point 220, location determination application 230 may look up the access point ID information in the location table, and may determine that the access point ID information is in the location table (arrow 6.2). Location determination application 230 may determine the location of user device 210 from the location table based on the access point ID information (arrow 6.3). Location determination application 230 may generate a location record (arrow 6.4) that identifies the location of user device 210 at a particular time. Record storage and analysis server 240 may output the location record to record storage and analysis server 240 (arrow 6.5), and record storage and analysis server 240 may store the location record (arrow 6.6) for later retrieval. Since the access point ID information is stored in the location table, location determination application 230 may determine the location of user device 210 without invoking location identification hardware and/or location identification software processes on user device 210. As a result, power consumption on user device 210 may be reduced when determining the location of user device 210.

Figure 7:
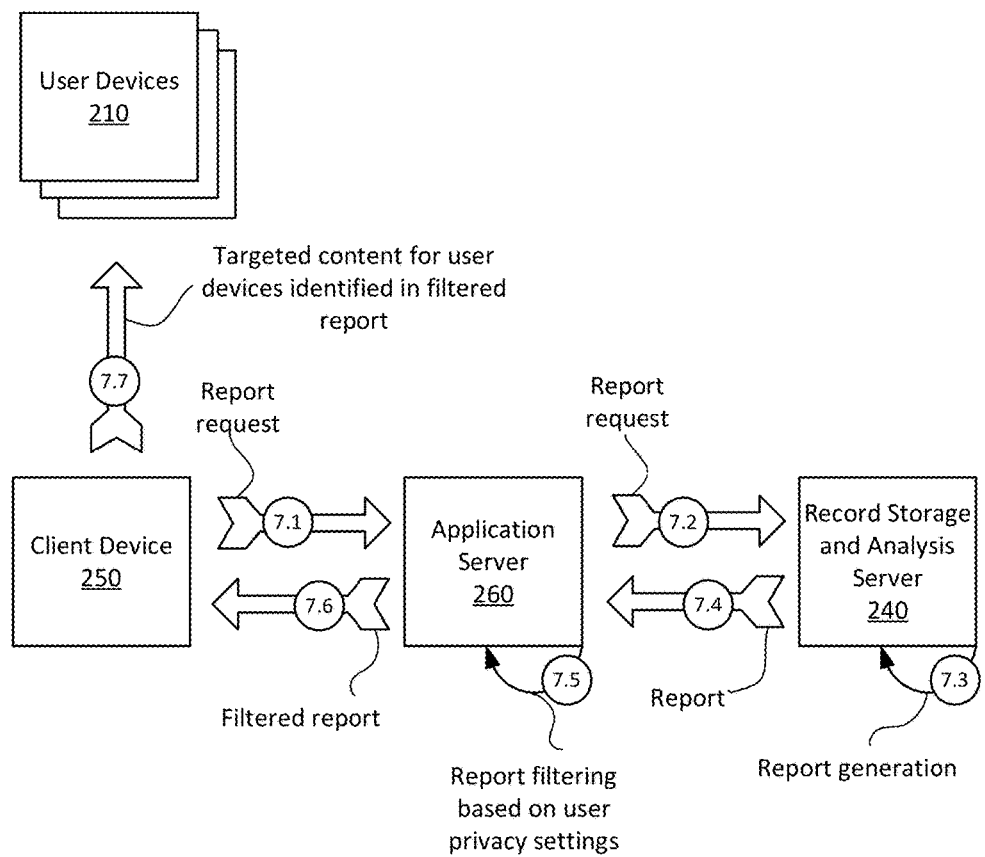
FIG. 7 illustrates an example implementation for generating and outputting a filtered report to a client device.

FIG. 7 illustrates an example implementation for generating and outputting a filtered report to a client device. As shown in FIG. 7, client device 250 may output a report request towards record storage and analysis server 240 (arrow 7.1). The report request may identify a party of client device 250, and may include a request to receive information regarding location records that meet particular criteria. For example, the report request may include a request for information identifying user devices 210 that were within proximity of a particular location (e.g., a merchant facility) at a particular time. Additionally, or alternatively, the report request may include a request for user profiles of user devices 210 that were within proximity of a particular location at a particular time. Additionally, or alternatively, the report request may include a request for information identifying user devices 210 that have traveled to particular locations in a particular timeframe. Additionally, or alternatively, the report request may include a request identifying the locations of user devices 210 before and after the user devices 210 traveled to a particular location (e.g., a request to identify where user devices 210 traveled before and after the user devices 210 traveled to a merchant's facility). Additionally, or alternatively, the report request may include a request identifying user devices 210 located at particular points of interests during a particular timeframe. Additionally, or alternatively, the report request may include a request identifying user devices 210 that have traveled on particular road segments at particular time periods. Additionally, or alternatively, the report request may include a request for other information. In some implementations, client device 250 may output the report request via a customer portal associated with application server 260.

Application server 260 may receive the report request, and may forward the report request to record storage and analysis server 240 (arrow 7.2). In some implementations, application server 260 may authenticate client device 250 prior to forwarding the report request. Based on receiving the report request, record storage and analysis server 240 may generate a report (arrow 7.3). For example, record storage and analysis server 240 may identify location records that meet the criteria identified in the report request (e.g., location records identifying user devices 210 that were at a location at a particular time, etc.). Record storage and analysis server 240 may output the report to application server 260 (arrow 7.4).

Based on receiving the report, application server 260 may filter the report based on privacy settings associated with user devices 210 (arrow 7.5). For example, application server 260 may delete location records identifying user devices 210 whose users have not expressly indicated that client device 250 may receive location information. Alternatively, application server 260 may modify the report request to exclude location records identifying user devices 210 whose users have not expressly indicated that client device 250 may receive location information. Application server 260 may then provide the filtered report to client device 250 (arrow 7.6). In some implementations, client device 250 may receive the report in order to provide targeted content for user devices 210 identified in the filtered report (arrow 7.7). Additionally, or alternatively, client device 250 may use the information in the report to aid in analysis (e.g., a shopping or travel pattern analysis, and/or another type of analysis).

While the systems and/or methods, described herein, describe that location determination application 230 as implemented within user device 210, in other implementations, the functions of location determination application 230 may be implemented external to user device 210. For example, the functions of location determination application 230 may be implemented by a server device at a location remote from user device 210 (e.g., as part of a location identification service).

Figure 8:
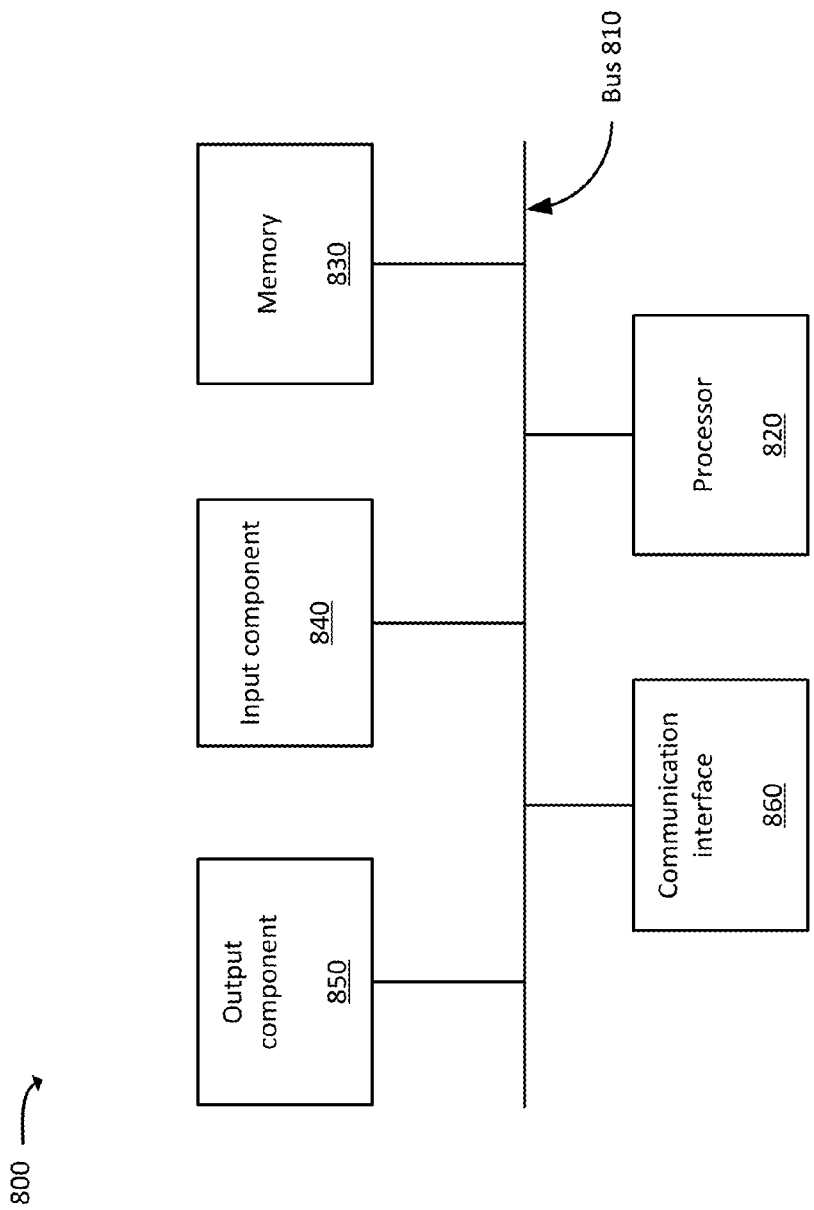
FIG. 8 illustrates example components of one or more devices, according to one or more implementations described herein.

FIG. 8 is a diagram of example components of device 800. One or more of the devices described above (e.g., with respect to FIGS. 1, 2, and, 5-7) may include one or more devices 800. Device 800 may include bus 810, processor 820, memory 830, input component 840, output component 850, and communication interface 860. In another implementation, device 800 may include additional, fewer, different, or differently arranged components.

Bus 810 may include one or more communication paths that permit communication among the components of device 800. Processor 820 may include a processor, microprocessor, or processing logic that may interpret and execute instructions. Memory 830 may include any type of dynamic storage device that may store information and instructions for execution by processor 820, and/or any type of non-volatile storage device that may store information for use by processor 820.

Input component 840 may include a mechanism that permits an operator to input information to device 800, such as a keyboard, a keypad, a button, a switch, etc. Output component 850 may include a mechanism that outputs information to the operator, such as a display, a speaker, one or more light emitting diodes (LEDs), etc.

Communication interface 860 may include any transceiver-like mechanism that enables device 800 to communicate with other devices and/or systems. For example, communication interface 860 may include an Ethernet interface, an optical interface, a coaxial interface, or the like. Communication interface 860 may include a wireless communication device, such as an infrared (IR) receiver, a Bluetooth® radio, or the like. The wireless communication device may be coupled to an external device, such as a remote control, a wireless keyboard, a mobile telephone, etc. In some embodiments, device 800 may include more than one communication interface 860. For instance, device 800 may include an optical interface and an Ethernet interface.

Device 800 may perform certain operations relating to one or more processes described above. Device 800 may perform these operations in response to processor 820 executing software instructions stored in a computer-readable medium, such as memory 830. A computer-readable medium may be defined as a non-transitory memory device. A memory device may include space within a single physical memory device or spread across multiple physical memory devices. The software instructions may be read into memory 830 from another computer-readable medium or from another device. The software instructions stored in memory 830 may cause processor 820 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations. For example, while a series of blocks have been described with regard to FIG. 3, the order of the blocks may be modified in other implementations. Further, non-dependent blocks may be performed in parallel.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown (e.g., in FIGS. 1, 2, and, 5-7), in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

Some implementations are described herein in conjunction with thresholds. The term "greater than" (or similar terms), as used herein to describe a relationship of a value to a threshold, may be used interchangeably with the terra "greater than or equal to" (or similar terms). Similarly, the term "less than" (or similar terms), as used herein to describe a relationship of a value to a threshold, may be used interchangeably with the term "less than or equal to" (or similar terms). As used herein, "satisfying" a threshold (or similar terms) may be used interchangeably with "being greater than a threshold," "being greater than or equal to a threshold," "being less than a threshold," "being less than or equal to a threshold," or other similar terms, depending on the context in which the threshold is used.

To the extent the aforementioned implementations collect, store, or employ personal information provided by individuals, it should be understood that such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A method comprising:
   determining, by a user device, an access point within communication range of the user device;
   determining, by the user device, whether location information, associated with the access point, was previously stored by the user device in a data structure;
   obtaining, by the user device and when the location information associated with the access point was not previously stored by the user device, location information of the user device, the obtaining including:
      invoking Global Positioning System (GPS) location identification hardware, associated with the user device, to obtain the location information of the user device without using the location information associated with the access point;
   storing, by the user device and when the location information associated with the access point was not previously stored by the user device, the obtained location information of the user device, in the data structure, as location information corresponding to the access point;
   obtaining, by the user device and based on the determination that the location information of the access point is stored in the data structure, the location information of the user device from the data structure without invoking the GPS location identification hardware;
   generating, by the user device, a location record identifying the location of the user device; and
   storing or outputting, by the user device, the location record,
   wherein the obtaining of the location information of the user device is periodically performed at a time interval that is determined based on a traveling speed of the user device.

2. The method of claim 1, further comprising:
   updating the location information of the access point based on a strength of a signal received by the user device and outputted by the access point.

3. The method of claim 1, further comprising:
   receiving, from the access point, access point identification information identifying the access point,
   wherein determining whether the location information, associated with the access point, is stored by the user device in the data structure includes looking up the access point identification information in the data structure.

4. The method of claim 3, wherein the access point identification information includes at least one of:
   a media access control (MAC) address associated with the access point,
   a hardware identifier associated with the access point, or
   a service set identifier (SSID) of a wireless network associated with the access point.

5. The method of claim 3, wherein receiving the access point identification information includes extracting the access point identification information from beacon frames outputted by the access point.

6. The method of claim 1, further comprising:
   determining that the location of the user device should be identified after a particular time period has passed from which the location of the user device was previously identified,
   wherein determining whether the location information, associated with the access point, was previously stored by the user device in the data structure is based on determining that the location of the user device should be identified.

7. The method of claim 1, further comprising:
   determining that an access point is not within communication range; and
   invoking the location identification hardware on the user device to determine the location of the user device based on determining that the access point is not within communication range.

8. The method of claim 1, wherein the time interval is further determined based on whether the user device was indoors or outdoors when the location of the user device was identified.

9. A system comprising:
   a device, comprising:
      a non-transitory memory device storing:
         a plurality of processor-executable instructions; and
      a processor configured to execute the processor-executable instructions, wherein executing the processor-executable instructions causes the processor to:
         determine an access point within communication range of the user device;
         determine whether location information, associated with the access point, was previously stored by the user device in the data structure;
         obtain, when the location information associated with the access point was not previously stored by the user device, location information of the user device, the obtaining including:
            invoking Global Positioning System (GPS) location identification hardware, associated with the user device, to obtain the location information of the user device without using the location information associated with the access point;
         store, when the location information associated with the access point was not previously stored by the user device, the obtained location information of the user device, in the data structure, as location information corresponding to the access point;
         obtain, based on the determination that the location information of the access point is stored in the data structure, the location information of the user device from the data structure without invoking the GPS location identification hardware;
         generate a location record identifying the location of the user device; and
         store or output the location record,
         wherein the obtaining of the location information of the user device is periodically performed at a time interval that is determined based on a traveling speed of the user device.

10. The system of claim 9, wherein executing the processor-executable instructions further causes the processor to:
    update the location information of the access point based on a strength of a signal received by the user device and outputted by the access point.

11. The system of claim 9, wherein executing the processor-executable instructions further causes the processor to:
    receive, from the access point, access point identification information identifying the access point,
    wherein executing the processor-executable instructions, to determine whether the location information, associated with the access point, is stored by the user device in the data structure, causes the processor to look up the access point identification information in the data structure.

12. The system of claim 11, wherein the access point identification information includes at least one of:
a media access control (MAC) address associated with the access point,
a hardware identifier associated with the access point, or
a service set identifier (SSID) of a wireless network associated with the access point.

13. The system of claim 11, wherein executing the processor-executable instructions, to receive the access point identification information, causes the processor to extract the access point identification information from beacon frames outputted by the access point.

14. The system of claim 9, wherein executing the processor-executable instructions further causes the processor to:
determine that the location of the user device should be identified after a particular time period has passed from which the location of the user device was previously identified,
wherein executing the processor-executable instructions, to determine whether the location information, associated with the access point, was previously stored by the user device in the data structure, causes the processor to determine whether the location information is stored by the user device in the data structure based on determining that the location of the user device should be identified.

15. The system of claim 9, wherein executing the processor-executable instructions further causes the processor to:
determine that an access point is not within communication range; and
invoke the location identification hardware on the user device to determine the location of the user device based on determining that the access point is not within communication range.

16. The system of claim 9, wherein the time interval is further determined based on whether the user device was indoors or outdoors when the location of the user device was identified.

17. A non-transitory computer-readable medium, storing:
a data structure to associate wireless network access points with respective locations of the wireless network access points; and
a plurality of instructions which, when executed by one or more processors associated with a user device, cause the one or more processors to:
identify an access point within communication range of the user device;
determine whether the identified access point was previously stored in the data structure;
determine, when the identified access point is included in the data structure, a location of the user device from the data structure;
determine, when the identified access point is not included in the data structure, a location of the user device using Global Positioning System (GPS) location identification hardware associated with the user device and without using the data structure;
update, when the identified access point is not included in the data structure, the data structure, to associate the identified access point with the location of the user device determined using the location identification hardware; and
output the location of the user device as determined from the data structure or using the location identification hardware,
wherein the determining of the location information of the user device is periodically performed at a time interval that is determined based on a traveling speed of the user device.

18. The non-transitory computer-readable medium of claim 17, wherein one or more instructions, of the plurality of instructions, further cause the one or more processors to:
update the location information of the access point based on a strength of a signal received by the user device and outputted by the access point,
wherein one or more instructions, of the plurality of instructions, to store the location information, causes the one or more processors to store the location information after updating the location information.

19. The non-transitory computer-readable medium of claim 17, wherein one or more instructions, of the plurality of instructions, further cause the one or more processors to:
receive, from the access point, access point identification information identifying the access point,
wherein one or more instructions, of the plurality of instructions, to determine whether the access point is included in the data structure, causes the one or more processors to look up the access point identification information in the data structure.

20. The non-transitory computer-readable medium of claim 19, wherein one or more instructions, of the plurality of instructions, to receive the access point identification information, causes the one or more processors to extract the access point identification information from beacon frames outputted by the access point.

* * * * *